F. H. SLEEPER.
LOCK FOR VEHICLE CONTROL PEDALS.
APPLICATION FILED NOV. 17, 1917.
1,335,532.  Patented Mar. 30, 1920.
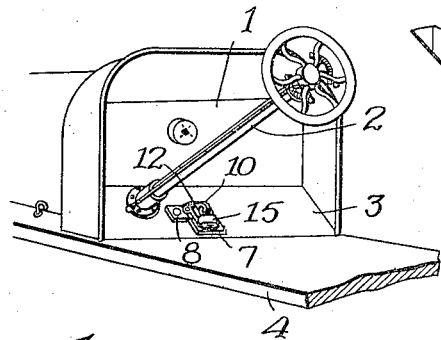
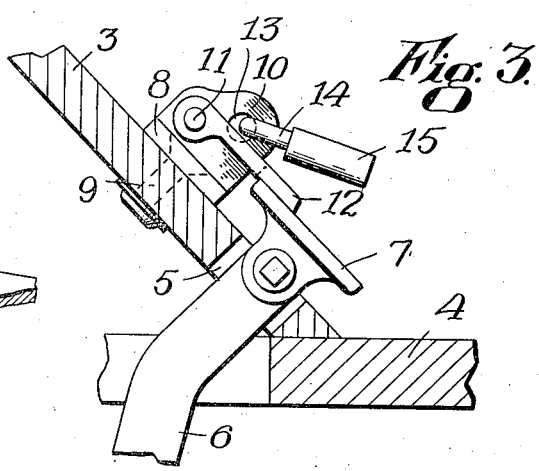
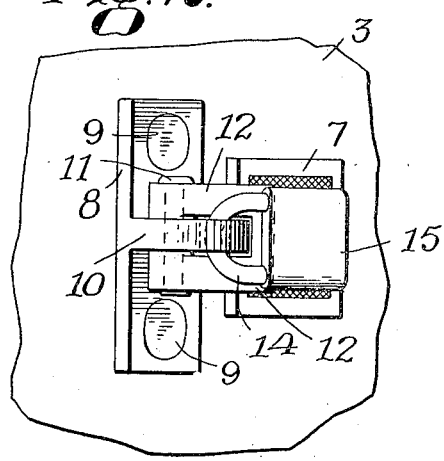
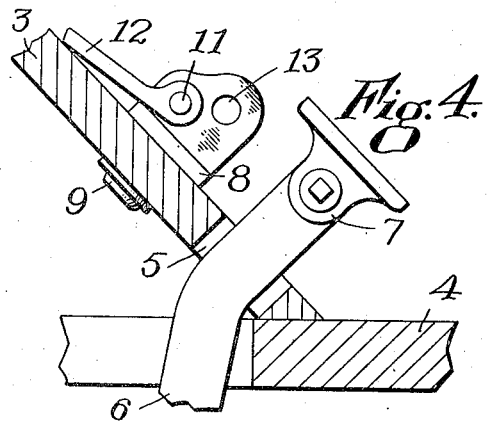
Inventor
Frank H. Sleeper
By Attorneys
Fowler & Kennedy

UNITED STATES PATENT OFFICE.

FRANK H. SLEEPER, OF WORCESTER, MASSACHUSETTS.

LOCK FOR VEHICLE-CONTROL PEDALS.

1,335,532.  Specification of Letters Patent.  Patented Mar. 30, 1920.

Application filed November 17, 1917. Serial No. 202,624.

*To all whom it may concern:*

Be it known that I, FRANK H. SLEEPER, a citizen of the Dominion of Canada, residing at Worcester, in the county of Worcester and Commonwealth of Massachusetts, United States of America, have invented a new and useful Improvement in Locks for Vehicle-Control Pedals, of which the following, together with the accompanying drawings, is a specification.

The present invention relates to improved means for protecting an automobile against theft, and has particular reference to the provision of instrumentalities for locking one of the control pedals of the automobile, as for instance the clutch pedal, out of operation, whereby movement of the automobile is prevented.

The object of the present invention is to provide such a locking device in a simpler and less expensive form than the devices of this class heretofore known, and with such regard to a number and arrangement of parts that it may be readily manufactured, will be durable and efficient in its action, and may be readily applied to any usual form of automobile without requiring material changes in the construction thereof.

The above and other objects are attained by the construction hereinafter described in detail, reference being had in this connection to the accompanying drawings, in which:

Figure 1 is a perspective view illustrating a portion of an automobile with my invention applied thereto, the parts being shown in locked position.

Fig. 2 is an enlarged plan view of the locking device shown in Fig. 1.

Fig. 3 is a view in elevation of said device, the adjoining parts of the automobile being shown in section.

Fig. 4 is a view similar to Fig. 3, but showing the device unlocked.

Like reference characters refer to like parts in the different figures.

Referring to Fig. 1, the cowl or dash of an automobile is indicated at 1, in the vicinity of the usual steering column 2. In the present instance an inclined plate 3 is disposed between the dash 1 and the floor 4 of the automobile, according to common practice, and this plate 3 provides a slot or slots 5 through which works freely the arm 6 of a pedal. As shown in Figs. 1 to 4 inclusive, this pedal 7 is of the usual form provided in automobiles, in position to be engaged and depressed by the foot of the driver, and in the present instance is shown as a "clutch" pedal, which normally is yieldingly extended outwardly under the influence of a spring, not shown, that maintains the clutch of the automobile in operative position, *i. e.*, connecting the engine with the transmission gearing, in the usual manner. As usual in devices of this class, the depression of the pedal 7 operates through the arm 6 to disengage the clutch, and thereby disconnect the driving gear of the automobile from the engine or source of power.

As shown in Figs. 1 to 4 inclusive, the plate 3, in the vicinity of the slot 5, has fixedly and non-removably connected thereto a member 8, by means of rivets 9 or the like, or if desired the member 8 may be cast integral with the plate 3. The member 8 provides an integral lug or ear 10, which has pivoted thereto at 11 an arm 12. As herein shown, the arm 12 is in the form of a yoke which embraces the lug 10 on opposite sides and the free end of said arm projects a sufficient distance, as shown in Figs. 2 and 3, to overlie the adjacent portion of pedal 7, when said arm is swung about its pivot in a clockwise direction. The lug 10 provides a hole 13 adapted to receive the hasp 14 of a padlock 15.

In the normal operation the arm 12 is swung back in the position indicated in Fig. 4, so as not to interfere with the operation of the pedal 7. When the automobile is stopped, and the operator wishes to leave the same secure against theft, the pedal 7 is depressed, to disengage the clutch, and while so held in depressed position the arm 12 is swung downwardly into the position indicated in Fig. 3. Thereupon the hasp 14 of padlock 15 is inserted through the hole 13, and the lug snapped shut. This locks the pedal in its depressed or inoperative position, since the arm 12 cannot be lifted or swung back, owing to the engagement of its upper surface with the hasp 14 of the lock. It is impossible to operate the automobile even though the engine be started, since the clutch is locked in its position of disengagement.

I claim:

1. In an automobile, the combination with a yielding member having on its free end a foot plate and constituting a foot pedal operatively connected with the mechanism of the automobile, of a fixed lug extending upwardly from the floor of the automobile in the plane of the movement of said yielding member, an arm pivoted on said lug and adapted to be swung over said foot plate when said yielding member is depressed, and an opening in said lug to receive a lock above said arm when the latter is in its operative position.

2. In an automobile, the combination with a yielding member operatively connected with the mechanism of the automobile, of a fixed lug extending upwardly from the floor of the automobile and in the plane of the movement of said yielding member, an arm pivoted to said lug adapted to rest by gravity against the floor of the automobile when in its inoperative position and to be swung over the top of said yielding member when the latter is depressed, and an opening in said lug above said arm when the latter is in its operative position to receive a lock to prevent the reversal of said arm.

FRANK H. SLEEPER.

Witnesses:
GEORGE D. HARTLEY,
ALFRED F. WILMOUTH.